United States Patent [19]

Paraskevakos

[11] 3,727,003

[45] Apr. 10, 1973

[54] DECODING AND DISPLAY APPARATUS FOR GROUPS OF PULSE TRAINS

[75] Inventor: Theodoros G. Paraskevakos, Athens, Greece

[73] Assignee: Paraskevakos Electronics & Communication, Inc., Wilmington, Del.

[22] Filed: Mar. 18, 1971

[21] Appl. No.: 125,705

[52] U.S. Cl. ....................178/28, 178/17, 340/324 R

[51] Int. Cl. ............................................H04l 25/38

[58] Field of Search......................340/379, 324, 325, 340/336; 178/17, 28, 32, 34, 35, 38, 4.1

[56] References Cited

UNITED STATES PATENTS

| | | | |
|---|---|---|---|
| 2,307,660 | 1/1943 | Bascom | 340/379 |
| 2,353,673 | 7/1944 | Kennedy | 178/35 |
| 3,493,957 | 2/1970 | Brooks | 340/336 |

*Primary Examiner*—John W. Caldwell
*Assistant Examiner*—Marshall M. Curtis
*Attorney*—Cushman, Darby & Cushman

[57] ABSTRACT

Receiving apparatus for decoding a plurality of signal pulse trains, each pulse train representing one digit of a calling telephone number or other data values and for displaying the complete telephone number and data in decimal notation after decoding. Special means are employed for detecting the end of each pulse train and the occurrence of a uniquely identifiable pulse train representing the beginning of a complete series of pulse trains corresponding to the series of digits in a calling telephone number or other data group and for routing each pulse train to a corresponding decoding and display stage. Other embodiments utilize electromechanical printing devices which are not limited to any particular number of digits.

18 Claims, 13 Drawing Figures

PATENTED APR 10 1973

3,727,003

INVENTOR

THEODOROS G. PARASKEVAKOS

BY Cushman, Darby & Cushman

ATTORNEYS

INVENTOR

THEODOROS G. PARASKEVAKOS

BY Cushman, Darby & Cushman

ATTORNEYS

INVENTOR
THEODOROS G. PARASKEVAKOS

BY Cushman, Darby & Cushman
ATTORNEYS

INVENTOR
THEODOROS G. PARASKEVAKOS

BY Cushman, Darby & Cushman
ATTORNEYS

INVENTOR
THEODOROS G. PARASKEVAKOS

BY Cushman, Darby & Cushman
ATTORNEYS

INVENTOR
THEODOROS G. PARASKEVAKOS

BY Cushman, Darby & Cushman
ATTORNEYS

INVENTOR

THEODOROS G. PARASKEVAKOS

BY Cushman, Darby & Cushman

ATTORNEYS

DECODING AND DISPLAY APPARATUS FOR GROUPS OF PULSE TRAINS

This invention generally relates to apparatus for receiving and decoding a series of signal pulse trains and for displaying a number composed of a series of digits represented by the series of pulse trains.

More specifically, the receiving apparatus of this invention is suited for receiving pulse trains such as those generated by transmitting apparatus disclosed in my earlier commonly assigned copending applications Ser. No. 13,269 filed Feb. 24, 1970; Ser. No. 76,436 filed Sept. 29, 1970; and Ser. No. 84,447 filed Oct. 27, 1970.

Such transmitting apparatus may be located at a central telephone exchange and adapted to send a series of signal pulses to a called telephone representing the calling telephone number. Each individual pulse train represents an individual digit of the telephone number with a series of ten such pulse trains representing the usual ten digit telephone number including an area code. Extra digits may also be transmitted to convey additional information concerning the calling number, such as identification as a pay phone booth, etc. In addition another "digit" having uniquely identifiable characteristics is used to signify the beginning of a complete series of signal pulse trains.

In each case, the number of pulses in each train is usually representative of the corresponding digit value. For instance, the telephone no. 312-217-6864 would usually be transmitted (disregarding the uniquely identifiable train, and the added information trains) as a series of 10 pulse trains with the first pulse train consisting of three pulses, the second having one pulse, the third having two pulses, etc. Each pulse train is separated by a dead time or quiescent period exceeding that which occurs between individual pulses in any single train and the uniquely identifiable pulse train is for example, conprised of 12 pulses to make it different from any other pulse trains. Of course, other specific numerical codes could be used for the digit and uniquely identifiable pulse trains as will be apparent to those in the art and as will be explained in more detail with one of the embodiments discussed below. It should also be understood that alphabetic characters could be represented by a more complete code structure of this type.

This invention is directed to a receiving apparatus for installation at the called telephone site for decoding such a series of transmitted pluse trains and for displaying the calling telephone number (and perhaps alphabetic information such as the callers name) in either permanent or temporary form. In this manner, if the called telephone is busy, the user can be notified of another party's attempt to call and of the calling party's identification in the form of the calling telephone number as well as possible extra code digits providing extra information about the calling telephone. Of course, such a receiver could also be used to provide this information to a non-busy called telephone thus giving the called party some advance information about the calling party even before the called telephone is answered. In general the transmitting apparatus at the originating telephone exchange is stimulated to send the coded pulses upon receipt of (and between) either ring back signals or busy signals as should be apparent to those in the art.

Those skilled in the art will also recognize that this invention could be used for receiving other forms of data as well. That is, the pulse trains received upon calling a bank could represent the caller's bank balance. Stock market quotations and many other types of information could be represented by the received pulse trains as should be apparent.

The possible uses of such a receiver to provide telephone call back information and to permit discretionary answering of the telephone, etc., should also be readily apparent. In addition, it is possible to utilize the receiver as an automatic call tracing apparatus in situations involving crimes such as extortion, threats and obscene telephone calls which are becoming more of a problem as telephones are ever more widely disseminated. Other uses will be apparent to those in the art.

Briefly, one embodiment of this invention comprises means for separating each incoming series of pulse strains into individual pulse trains which are then successively channeled to individual digit decoding and display means whereby each successive pulse train is individually decoded and displayed in decimal notation until the entire telephone number represented by the series of pulse trains is available for the called telephone user's information. Other embodiments utilize a printing apparatus for printing each digit of information as it is received or shortly thereafter to permit use of any desired number of digits in any given transmission.

In one of the exemplary embodiments described in more detail below, the pulse trains are separated and decoded by electronic means including a logic gate for passing each individual pulse train to an associated decoding and display apparatus. Each logic gate is controlled by a particular stage of a shift register means which is, in turn, controlled by electronic means for detecting the extra dead time space occurring between pulse trains and by a special means for detecting the uniquely identifiable or "starting" pulse train. In effect, the "starting" pulse train synchronizes the receiving apparatus with the transmitted pulses by initiating the shift register's operation in a predetermined state corresponding to the beginning of a complete series of pulse trains. Thereafter, each detected extra dead time space between pulse trains causes the shift register to shift and thereby enable the next successive gate for passing the next pulse train to the next successive digit decoding and display stage.

Another exemplary embodiment of the invention uses a single printing stage for both decoding and printing each individual successive digit of the incoming data. Once a uniquely identifiable "start" signal or digit is detected, subsequent pulse trains cause a print wheel to be incrementally advanced by each incoming pulse with printing occurring in a "dead time" between each pulse train which is detected by a digit separation detector. Preferably, to increase the efficiency and simplicity of the decoding and printing mechanism, the incoming pulse trains are coded such that each pulse train includes the requisite number of pulses for moving a print wheel from its just previous position to the new desired position. Thus, in this embodiment, the number of pulses in a given train representing a given digit value is a function of the previous digit values in that particular data transmission.

A more complete and detailed understanding of this invention and its objects may be obtained from the following detailed description in conjunction with the accompanying drawings of which:

FIG. 5 is a more detailed circuit diagram of a typical decoding and display means shown in block form in FIG. 1;

Figures 1, 6:
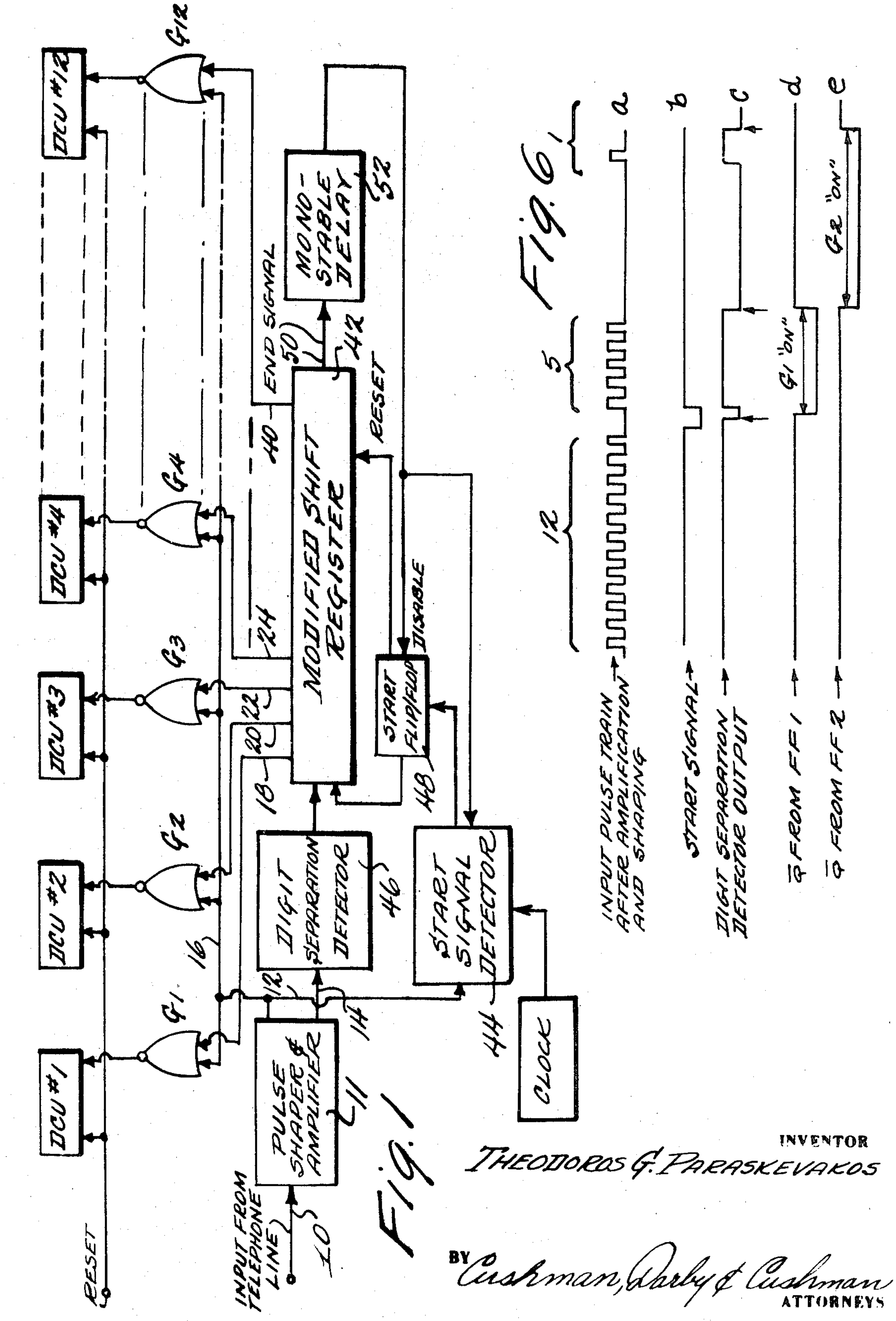
FIG. 1 is an overall block diagram of an exemplary embodiment of this invention.
FIG. 6 is a graph showing some of the wave forms occurring in the exemplary embodiment of FIG. 1.

Referring to FIG. 1, the receiver input on line 10 is taken from the incoming telephone line and, after amplification and shaping is presented on lines 12 and 14 as a series of pulse trains such as partially shown on line *a* of FIG. 6. Here the first or "starting" train comprises 12 adjacent pulses while the next two pulse trains comprise five and one pulses respectively.

These pulse trains are all input via line 16 to one input of gates G1, G2, . . . G12. Thus, when the other input of these gates is enabled (by a low input in the case of NOR gates, as shown), the pulse train occurring during the period of enablement will pass on to the respectively associated decoding and counting units DCU No. 1, DCU No. 2, . . . DCU No. 12 as should be apparent from FIG. 1. That is, to function properly, gate G1 should be enabled during the time when the pulse train of 5 pulses is present on line 16 while gate G2 should be enabled for the next pulse train of one pulse, etc. In this manner, each digit of the calling telephone number is successively displayed after successive gating and decoding of each corresponding pulse train as should now be apparent.

To accomplish this result, the other input of each gate G1, G2, . . . G12 is controlled on lines 18, 19, . . . 40 coming from successive individual stages of a modified shift register 42. By properly controlling the shift register, a predetermined state existing in any particular stage will enable the proper associated gate G1, G2, . . . G12 at the proper time.

The shift register 42 is, in turn, controlled by a start signal detector 44 and a digit separation detector 46. Before receipt of a series of pulse trains, the shift register is in a quiescent state with all stages in a common stage that prevents passage of any pulses through gates G1, G2, . . . G12. Then, when the "starting" pulse train of, for instance, 12 pulses is detected by detector 44, a start flip-flop 48 is set and that, in turn, causes the first stage of register 42 to change state thus enabling gate G1 as shown on lines *b* and *d* of FIG. 6. Thereafter, the register 42 is caused to shift by detecting digit or pulse train separations signified by negative transitions of the output from detector 46 as indicated by the arrows on line *c* of FIG. 6.

Accordingly, gate G1 remains "on" for the duration of the first pulse train. Then, gate G1 turns "off" and gate G2 turns "on" until the end of the second pulse train is detected, etc. After the last stage of register 42 has enabled gate G12, an end signal on line 50 flips a monostable delay circuit which disables start flip-flop 48 for a predetermined time period thus preventing another decoding cycle from beginning until the just displayed information has been available to the called telephone user for the predetermined time period.

As shown in FIG. 1, 12 channels are provided to accommodate 2 added information digits in addition to the standard 10 digit telephone number (including an area code). Of course, those in the art will readily appreciate that any desired number of digits can be accommodated by adding or subtracting shift register stages and associated gates, decoding and display apparatus.

Figure 2:
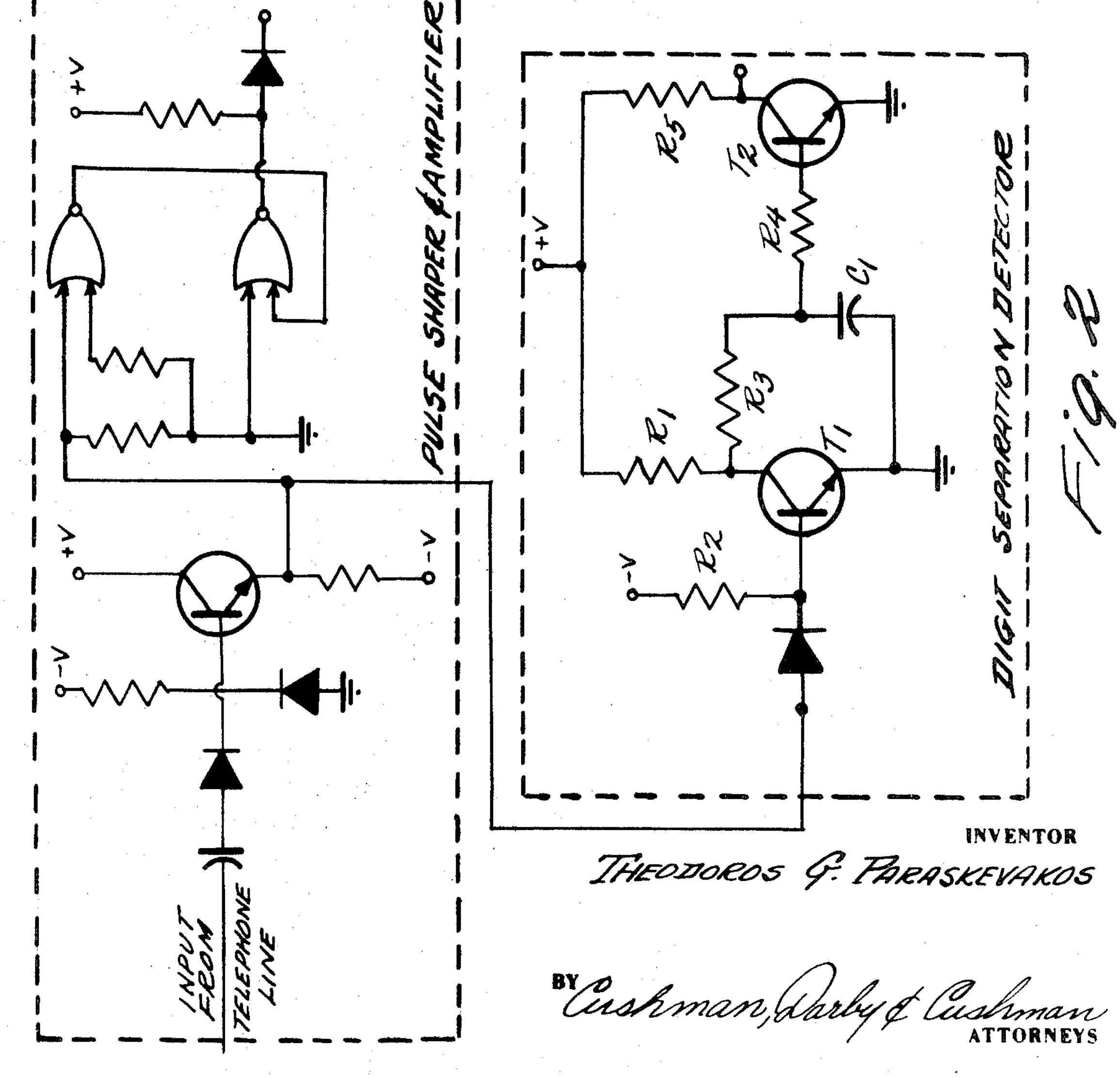
FIG. 2 is a more detailed circuit diagram of a typical pulse amplifier and shaper and digit separation detector shown in block form in FIG. 1.
Figure 3:
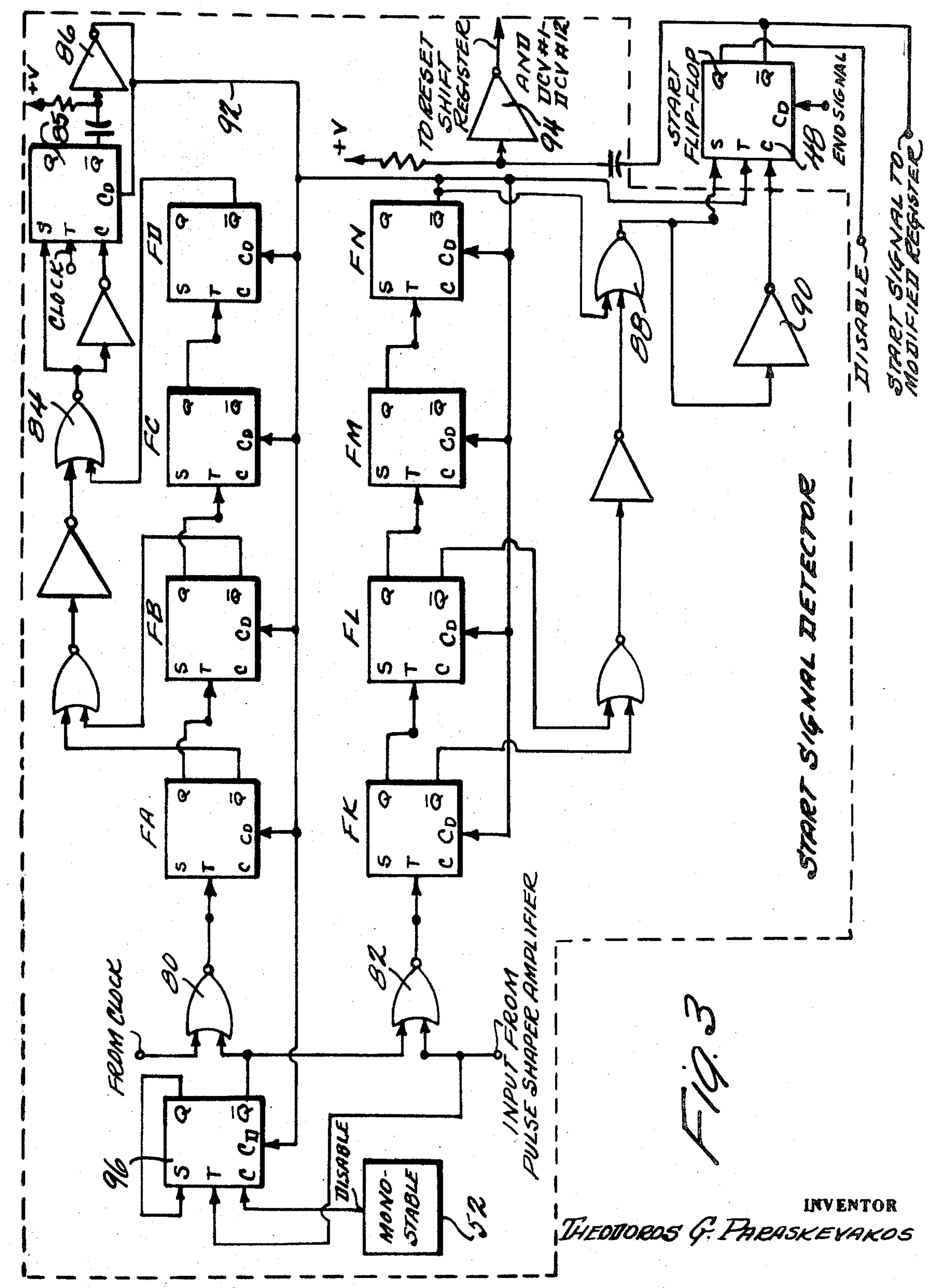

Referring now to the exemplary pulse amplifier and shaper and the digit separation detector shown in FIG. 2, the input circuit is an emitter-follower amplifier or switch which serves to amplify the input current. Its output is connected to an integrated circuit Schmitt trigger, which is utilized to square the input pulses as should be apparent to those in the art. The Schmitt trigger includes two typical two-input gates (i.e., Motorola MC724P). The output of the emitter follower switch is also connected with the input of a one-shot multivibrator comprising the digit separation detector as shown in FIG. 2.

Those in the art will appreciate that the input means could just as well comprise conventional automatic gain or level control circuitry and/or clipping circuits to standardize the input pulses.

The one-shot multivibrator unit provides an output at the end of each digit of the incoming calling number by utilizing the knowledge that between each two of the incoming trains of pulses, there is a dead time equal to at least two periods at the receiving frequency. As soon as the first positive pulse of a train of pulses representing a digit appears in the input of the one-shot, its output will become positive as shown on line *c* of FIG. 6. During the half negative period of the input pulse, the output of the one-shot will remain positive because the time constant of R1 C1 and hence the period of the one-shot has been made at least equal to one period at the incoming frequency.

As the last pulse of the one-shot input pulse train changes to "0" volts, the output of the one-shot will also drop to "0" volts after a time equal to the time constant R1 C1 and will remain at "0" level until the first positive pulse of the next train of pulses occurs representing the next incoming digit. Thus, as shown on line *c* of FIG. 6, each negative transition of the digit detector output represents a point in time that occurs between individual incoming pulse trains.

Figure 3:
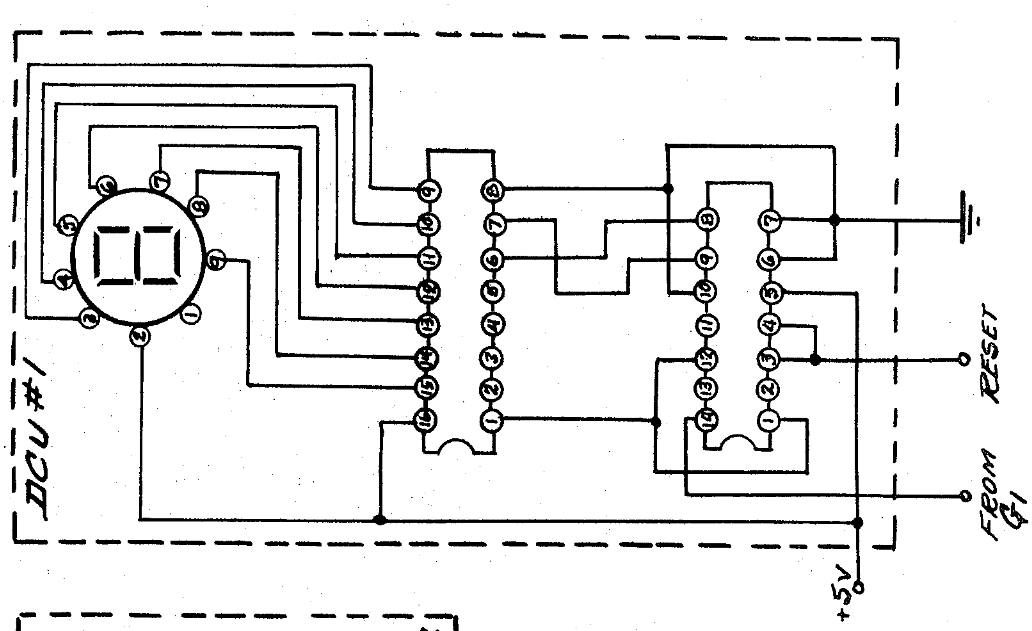
FIG. 3 is a more detailed circuit diagram of a typical start signal detector shown in block form in FIG. 1.

Referring now to FIG. 3, a typical start signal detector circuit is shown in more detail. In essence, this circuit comprises two digital counters with one counting clock pulses (occurring at the same nominal frequency as pulses within a pulse train) and another counting incoming pulses. If, during a single pulse train, both the counters reach a predetermined contents, such as 11, then this is an indication that that particular pulse train has at least 11 pulses. Actually, since in the exemplary embodiment shown, the first pulse of a train is utilized to set the input gating circuits, when the counters reach 11, it indicates that a total of 12 pulses have occurred in the same pulse train. Since only the uniquely identifiable "starting" pulse train has 12 pulses, the coincidence of a contents of 11 in both of the counters is taken as an indication of the "starting" pulse train and a complete operational cycle of decoding and displaying a complete series of pulse trains is initiated.

Referring to FIG. 3, the first counter comprises four flip-flops FA-FB-FC-FD, forming a binary counter. The second counter also comprises four flip-flops FK-FL-FM-FN forming another binary counter. Gate 80 will feed clock pulses to the first binary counter and after eleven pulses this binary counter will be in a configuration of: FA "ON," FB "ON", FC "OFF," and FC "ON" as should be apparent to those in the art. Gate 82 feeds the second binary counter with pulses coming from the telephone line. If these pulses are the predetermined uniquely identifiable signal, then at the end of the eleventh pulse, the second binary counter will also be in the same configuration as the first one. That is: FK "ON," FL "ON," FM "OFF," and FN "ON". As soon as the first binary counter is placed in the said configuration, the output of gate 84 will be placed in a plus (+) potential condition and with the next rise of a clock pulse, flip-flop 85 will be flipped thus causing buffer 86 to give a positive pulse to reset both counters and to trigger start flip-flop 48.

Because of the configuration of the second binary counter, gate 88 will make the input S of flip-flop 48 (Starting flip-flop) positive, and inverter 90 makes the input C of FS ground (0 volts).

Then when the buffer 86 provides a positive pulse on line 92 the following things take place (assuming receipt of the uniquely identifiable signal):

a. Flip-flop 48 turns "ON" (i.e., Q outputs plus (+) potential and $\overline{Q}$ '0' potential).

b. Buffer 94 gives a positive pulse which is used to reset the flip-flops FF2 to FF12 and DCU No. 1 to DCU No. 12.

c. Both binary counters will be reset.

Flip-flop 96 is to control the gates 80 and 82 properly. For instance, suppose that when monostable 52 has gone off, then the first pulse of the predetermined signal of 12 pulses appears in the input of the circuit, flip-flop 96 will be flipped "ON" and latched in that condition until reset by a pulse from buffer 86. The output $\overline{Q}$ of flip-flop 96 will then become '0' volts thus enabling gates 80 and 82. As can be seen, this gate setting process has consumed the first pulse so that the actual counter contents is one less than the number of pulses in the pulse train as previously noted.

On the other hand, suppose the first pulse train which comes from the telephone line is not the predetermined signal. In this case the counters will begin to cycle, but the moment that the first binary counter reaches the predetermined configuration of FA "ON," FB "ON," FC "OFF," and FD "ON," the second binary counter will not then be in the same configuration, because the incoming pulse train will not have twelve pulses.

Because the first binary counter does always reach the predetermined configuration, buffer 86 always provides a positive pulse which appears in the T input of flip-flop 48. But since the second binary counter will be in a configuration different than the desirable one (the desirable one is: FK "ON," FL "ON," FM"OFF," and FN "ON"), flip-flop 48 will not change states but rather, the input S of flip-flop 48 will still be "0" volts and input C of 48 will be positive and so flip-flop 48 will remain "OFF." However, as should be apparent, buffer 86 will still reset both binary counters to prevent the next pulse train pulses from accumulating in the second counter.

Figure 4:
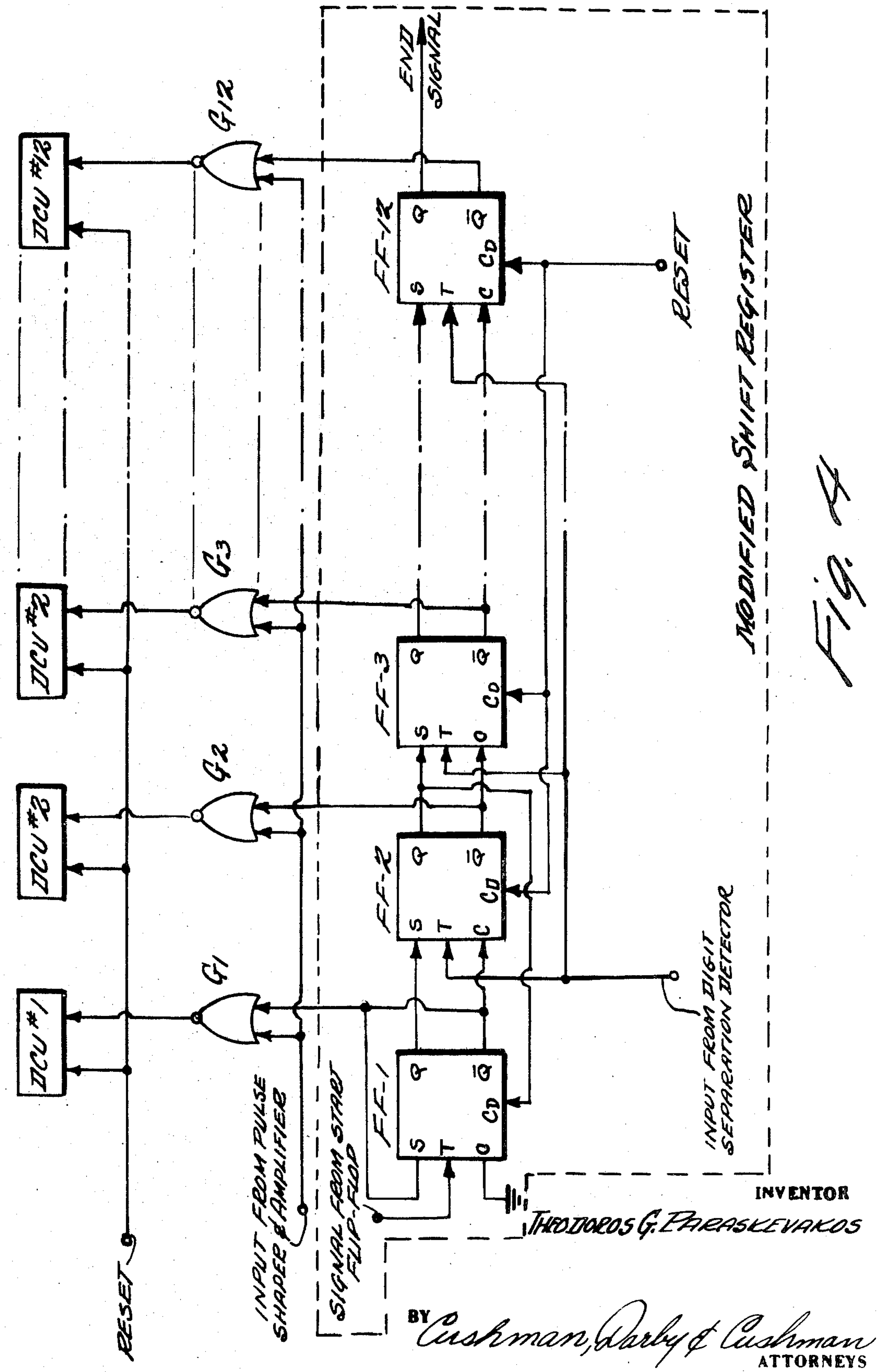
FIG. 4 is a more detailed circuit diagram of a typical modified shift register shown in block form in FIG. 1.

Referring now to the exemplary embodiment of the modified shift register or priority determine unit shown in more detail at FIG. 4. This unit comprises a number of flip-flops corresponding to the number of digits needed to record the calling telephone number and any added information digits. Each one of flip-flops FF1, FF2, FF3, . . . FF12 is connected to a gate G1, G2, G3 . . . G12, and each gate is connected with one decade counter unit (DCU No. 1, DCU No. 2, . . . DCU No. 12) as previously described.

Now, as shown in FIG. 4, as soon as starting flip-flop 48 turns "on," a trigger is given to the first flip-flop FF1 of the priority determine unit or shift register. Thus, FF1 will turn "on," causing its Q output to turn positive and the $\overline{Q}$ to turn to '0' volts. The output $\overline{Q}$ is then connected to one leg of the G1 gate and so this gate is enabled or prepared to permit the first train of pulses, representing the first digit of the calling number, to pass therethrough and to appear at the input of the first decade counter unit DCU No. 1. At the end of this train of pulses the output of the one-shot or digit separation detector 46 will drop to '0' volts, and this negative transition will give a trigger to all the rest of the flip-flops FF2, FF3, . . . FF12 of the shift register, but only FF2 will turn "on" at this time, because only the previous FF1 is "on."

As soon as FF2 turns "on", FF1 turns "off" because the Q output of FF2 turns positive and is used to reset FF1 as shown. The $\overline{Q}$ output of FF2 turns to '0' volts as should be apparent. Accordingly, the $\overline{Q}$ output of FF2 is connected with one leg of gate G2 to enable this gate for passing the second train of pulses representing the second digit of the calling number which will appear at the input of the second DCU No. 2. At the end of this train of pulses the one-shot or detector 46 will give another trigger to all flip-flops (except FF1) of the shift register 42. This trigger will turn "on" and turn "off" FF2, etc.

After having permitted the appearance of the last digit in the DCU No. 12 (i.e., FF12 is "on"), the one-shot detector 46 will give a final trigger to the shift register stages FF2, FF12. This trigger will turn "off" FF12 and provide an input signal to a Monostable Multivibrator 52, which with a delay determined by an RC circuit, resets the start flip-flop 48, and keeps it blocked for a certain predetermined time during which no further pulse trains may be decoded such that the just decoded and displayed calling telephone number will not be disturbed for at least this predetermined delay period.

The decade counter unit DCU No. 1 is shown in more detail at FIG. 5. In essence, it comprises any suitable conventional digital counting and display mechanism. In the preferred exemplary embodiment shown in FIG. 5, a solid state binary counter is connected to count one decimal decade and to provide corresponding electrical outputs on a decade of output lines as shown. These electrical output lines are then connected to any suitable decade display device as will be appreciated by those in the art. Of course, electromechanical decoding and/or display and printing apparatus could also be used as should be apparent. Also, of course, any suitable digital display system that may be developed in the future can be used for the DCU devices.

Figure 7:
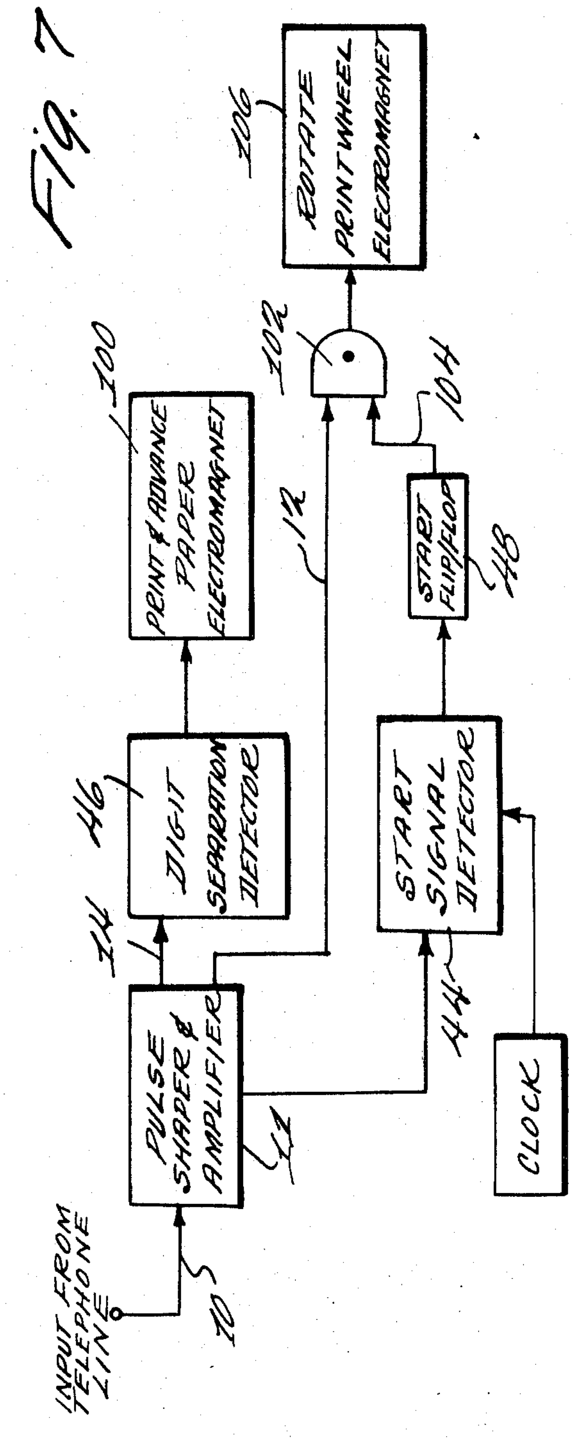
FIG. 7 is a block diagram of another exemplary embodiment of this invention.

A further exemplary embodiment of this invention is shown in block diagram form in FIG. 7. Here, the pulse shaper and amplifier 11, the digit separation detector 46, the start signal detector 44 and flip-flop 48 all function exactly as previously explained. However, now, rather than route each successive pulse train into a separate decoding and display channel, all the trains are processed in sequence by a single channel with each train being individually decoded and recorded.

A rotatable printing wheel with 12 circumferentially spaced print faces is utilized in this exemplary embodiment. For instance, the first ten faces would have the decimal digits 1, 2, 3, 4 . . . 9, 0 embossed in bas-relief thereon while the eleventh face might have the letter E embossed thereon and the twelfth face would have no figure, i.e., a blank that produces no print character.

In a normal rest state, the print wheel is aligned with the blank face opposite a print station wherein paper or other recording medium is moved by electromagnet 100 towards the print wheel to receive a print impression therefrom. Of course, in the rest condition, any negative transitions from digit separation detector 100 would not result in any actual printing since the blank print face is located opposite the print station.

However, as soon as start flip-flop 48 is set by start signal detector 44, then AND gate 102 is enabled by a signal on line 104 and thereafter incoming pulses on line 12 will be passed through to operate electromagnet 106 which causes the print wheel to rotate by one-twelfth of a revolution for each received pulse. Thus, in the case of presumed incoming pulse trains having 5, 8, 2, 4, 3, 5, 2, 2, 1, 11 pulses respectively, the wheel would first be rotated five-twelfths of a revolution until the print face having numeral "5" thereon is opposite the print station. Thereafter, the dead time between the first and second pulse trains will result in a negative transition of the digit separation detector 46 which will cause printing of the digit "5" and subsequent advancement of the paper through the print station. Then, the next pulse train of eight pulses will rotate the print wheel an additional eight-twelfths revolution until the digit "1" is opposite the print station. Thereafter, digit separation detector 46 will cause printing of this digit. The same process will eventually result in the printed number 5137035787 as should now be apparent.

While this embodiment has the distinct advantage of being capable of handling an unlimited number of digits (i.e., an unlimited data receiving capacity), at the same time it should now be evicent that it requires a slightly more complicated coding scheme at the transmitter. That is, except for the first pulse train, the number of pulses in each train must now correspond to the incremental difference between the last print wheel position and the desired next print wheel position as should be apparent. Of course, the simpler coding scheme could still be used if the print wheel were always returned to the blank print position after each printing operation but this would add some further complication to the print wheel mechanism as should be apparent.

A more detailed view of some of the mechanical elements of this last exemplary embodiment is shown in FIGS. 8, 9, 10 and 11.

The coil of electromagnet 106 operates a ratchet arm 110 which, in turn, incrementally engages and advances a ratchet wheel 112 attached to the twelve sided print wheel 114 thus providing means for incrementally advancing the print wheel as will be apparent to those in the art. The twelve sided print wheel has the following bas-relief characters embossed on its faces: "1," "2," "3," "4," "5," "6," "7," "8," "9," "0," "E," " " (blank space). To achieve a one-twelfth revolution for each cycle of the electromagnet 106, the ratchet wheel 112 has 12 cogs 116 and 12 holes 118. A spring biased slug 120 may be actuated by suitable means (an electromagnet) to fix any particular hole 118 and thereby hold the print wheel position fixed while ratchet arm 110 is being moved backwards in readiness for its next forward ratcheting motion. Thus, everytime electromagnet 106 is energized it can be arranged to cause a one-twelfth revolution of print wheel 114.

Figure 8:
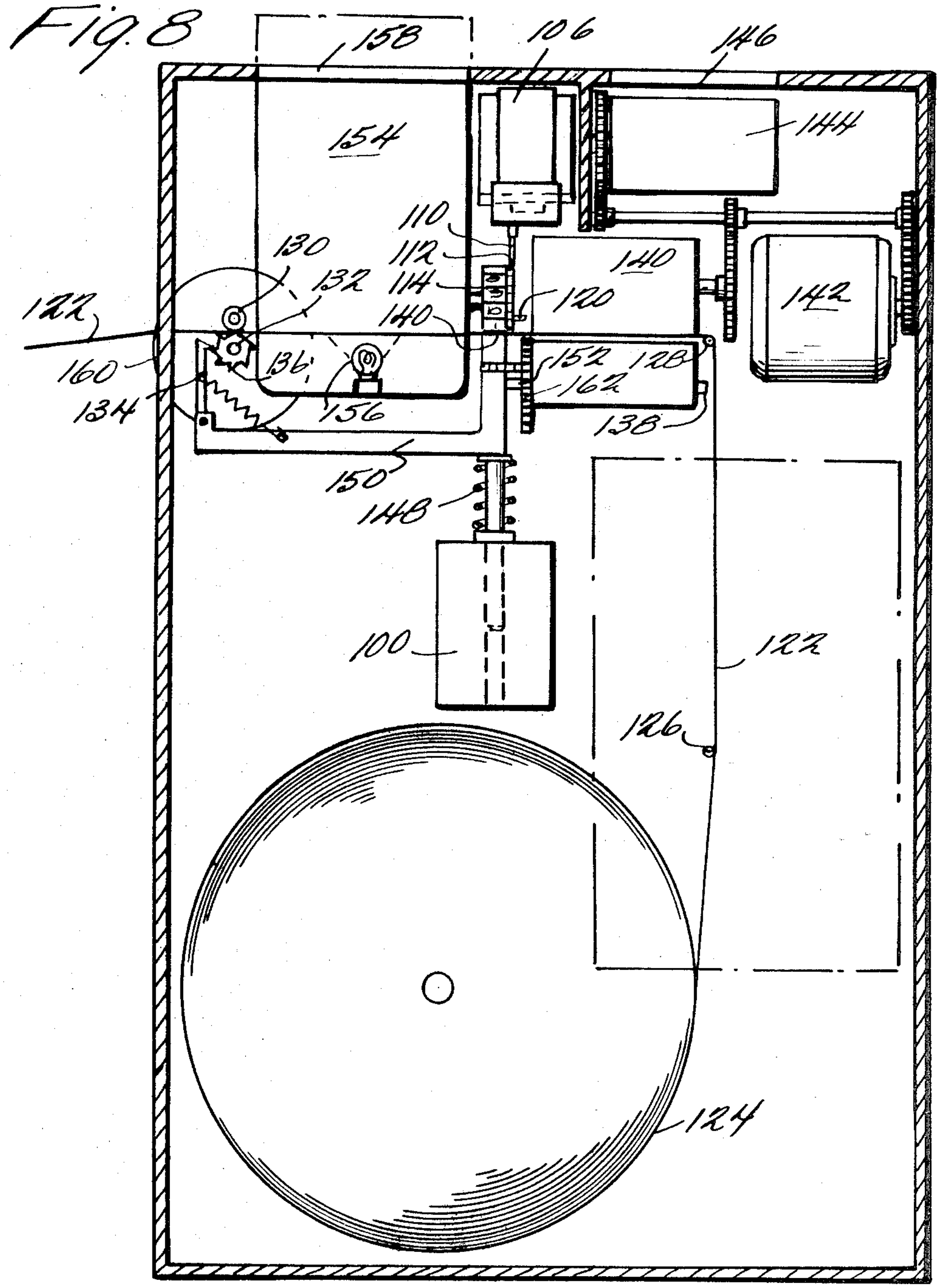
FIG. 8 is a more detailed cross-section view of the printing mechanism used in the FIG. 7 embodiment.
Figure 11:
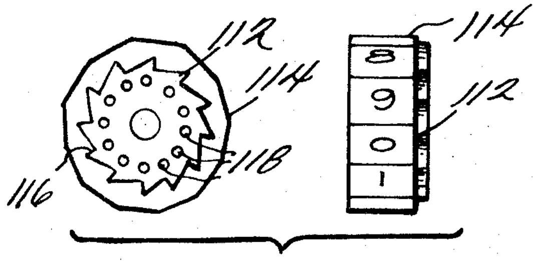
FIGS. 10 and 11 are cross-section views of part of the mechanism shown in FIG. 7.

A paper (or other recording medium such as impact sensitive chemical paper or the like) web 122 is unwound from roll 124 over rollers 126, 128 through friction or pin hole drive wheels 130, 132 at least one of which is driven by some means such as the ratchet arm 134 and attached ratchet wheel 136 shown in FIG. 8.

The paper is drawn over a time printing cylinder 138 and a character print station 140. On top of the time printing cylinder 138 are embossed time printing wheels which are turned through cog wheels by a clock motor 142 in the conventional manner. Thus, the current time (day, month, year, hour, minute, etc.) information may be recorded on the recording medium by bringing the printing cylinder 138 up to press the paper against inked time printing wheels 140 as should be apparent.

At the same time, another conventional clock device 144 may also be driven by clock motor 142 such that the current time is shown through a visible window 146.

In addition, the paper passes under print wheel 114 at print station 140. Everytime electromagnet 100 is released (negative transition of digit separation detector 46), spring 148 causes lever arm 150 to rise. Thus, print station 140 is actuated by an upward movement of the right hand end of arm 150 while ratchet arm 134 rises up to catch another cog on wheel 136 such that after the print is completed and arm 150 lowers again (electromagnet 100 energized) ratchet arm 134 will cause rotation of feed rollers 130, 132 to result in a paper feeding motion in readiness for printing the next character as should be apparent. In addition, a small projection 152 from arm 150 also actuates the time printing cylinder in the conventional manner to cause printing of the time data.

Figure 10:
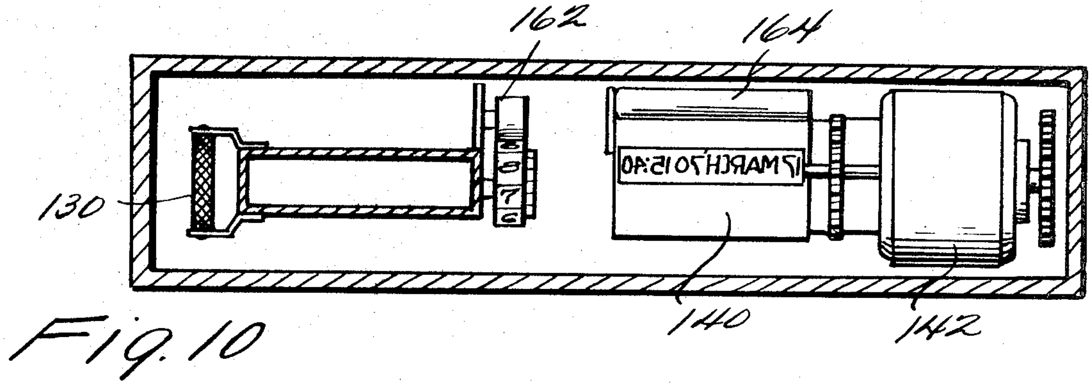

After such printing, the paper strip is moved through a viewing chamber 154 with a light source 156 below the paper and projecting through a transparent window 158 so that both the recorded time and number are visible to a user. Of course, the paper may be advanced on through the receiver by turning wheel 160 manually and the paper may be torn therefrom for other uses as will be apparent. The wndow 158 may have a 45° prism corner for 90° offset viewing of the data if desired. As shown in FIG. 10, both the wheel 114 and the timing wheels 140 are in contact with linked cylinders 162 and 164 respectively to keep the raised print characters covered with a film of ink in the conventional manner.

In operation, as soon as a pulse train of 12 pulses is received, the start signal detector 44 turns the start flip-flop "ON". The following pulses are passed by gate 102 to electromagnet 106. The electromagnet 106, in turn, cuases the print wheel 114 to rotate one-twelfth revolution for each received pulse. So if the first digit transmitted after the unique value "12" is the value "0", the pulse train will have 10 pulses therein to cause wheel 114 to step around 10/12 revolution until the number "0" appears at the print point or station where the paper is opposite the wheel. Now there is a dead time between the first and the second pulse trains and during this dead time, digit separation detector 46 will have a negative transition causing armature 150 of electromagnet 100 to move upward against the paper on the bas-reliefed inked surface, and by this movement, the number will be printed in the paper. In turn, the electromagnet 100 will again be energized and because of this, arm 150 will move down, ratchet arm 134 will turn the wheel 136 which will advance the paper 122 one step. At the same time, the time printing cog wheel 138 will advance one step.

Subsequently, the electromagnet 106 will be stimulated as soon as the second digit is received (i.e., the second pulse train) and if the second digit is different than the first one the electromagnet 106 will cause the necessary incremental rotations of wheel 114. But if this second digit is of the same value as the first (in this immediate example, the number "0") then the transmitter will not send any pulse and so the wheel 114 will remain unmoved for this time. Now after a certain time (equal to twelve clock pulses time) the digit separation detector is programmed to give another new pulse to the electromagnet 100 which, in turn, causes printing once more of the number "0" in the paper. Of course, the paper and the time printing cylinder 138 will also be advanced one step. If the next received digit value is the number 2, the transmitter will have been programmed to send four pulses which is, of course, equal to the already programmed space existing on wheel 114 between the number "0" and number "2".

The two pulses having now been passed through the digit separation detector 46 orders the electromagnet 100 to print the number two on the paper as should now be apparent.

The time printing cylinder 138 carries an eccentric arm throughout its length which cam strikes against the paper and prints all the time elements that exist at an exact moment; however this movement can take place only once per revolution when the surface of the cylinder is in such a position that it can press against the paper. Thus, since the cam is only incrementally advanced each time the paper is advanced, by adjusting the number of cogs on drive wheel 162, the time data can be caused to print at any desired interval. In the exemplary embodiment, the number of cogs on wheel 162 has been fixed at sixteen cogs, and this means that the time data is going to be printed after each sixteen cycles of the electromagnet 100. It can be programmed to print the time data during the first or second or third cycle of the electromagnet 100 as should be apparent.

Then in turn, if the next digit value that is to be received is the number one, then, the transmitter will be programmed to send 11 pulses, which is the exact distance between the number 2 and 1, on the wheel 144. After the 11 pulses have been received, the digit separation detector will order the electromagnet 100 to print and advance the paper. If the next digit is of value 3 then the transmitter will have been programmed to give two pulses (equal to the distance between number 1 to 3 on wheel 114).

As mentioned before, the transmitter has been programmed to give the difference between each two different digit values each time on the wheel 114. That is to say, if it is desired to transmit the number 205 6 2528161 E442 the transmitter will transmit the following numbers of pulses in successive pulse trains: 12 (as starting signal), and 2, 8, 7, 1, 8, 3, 9, 6, 5, 5, 7, 10, 5, 0, 10, 10.

Figure 9:
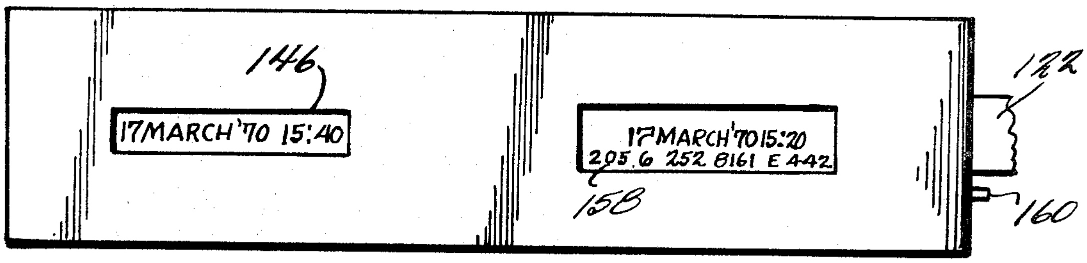
FIG. 9 is a front view of the printer shown in FIG. 8.

The last train of pulses represents the distance between the last transmitted number and the blank or nonprinting position on wheel 114. This last train is added because the wheel 114 must be returned to the same exact starting position each time in order to be able to accept any new incoming calling number. Further, this will avoid anything else from being printed on the paper during all following cycles of electromagnet 100 until the next start signal is received and detected. In the exemplary embodiment, the electromagnet 100 will normally go through 20 cycles for each received telephone number. From these 20 stimulations the first 16 are used for actually transmitting the telephone number and printing it on the paper (the first three are for the area code, the fourth one is for a special code, the seven following are for the telephone number, per se and the last four are for any extension number). All the remaining four cycles (or as many as desired) are used to remove the paper with the printed number thereon (and the simultaneously printed calling time) into the center of panel window 158. The number and time data are printed in the same area of the paper but in different levels as shown in FIG. 9.

The bas-reliefed letter E, on the wheel 114 can also be transmitted in code by the transmitter, and the after letter E the following digits would represent any extension numbers. This would primarily be useful in servicing large organizations, which use such telephone extension services as will be apparent. Of course, the transmission of such extra digits as extension numbers is facilitated in this exemplary embodiment since as many digits as desired may be transmitted without changing the receiver in any way. That is, this system has unlimited receiving capacity, which is different than the earlier described embodiments which have been prepared to accept a limited (i.e., predetermined) number of digits.

The digit separation detector 46 in this last embodiment can be comprised of a switch in series with the coil of electromagnet 100 instead of the monostable previously discussed. Here, the swtich should be mechanically coupled to turn off when electromagnet 100 is stimulated and to turn on with disstimulation of electromagnet 100. Since the switch action timing (and hence the stimulation-disstimulation cycle of electromagnet 100) is a function of the mechanical linkage, the coil electrical characteristics and the supply voltage, the timing can be adjusted by adjusting these parameters to cause the cycling to correspond with receipt of complete pulse trains and therefore to result in operation similar to that already described.

Figure 12:
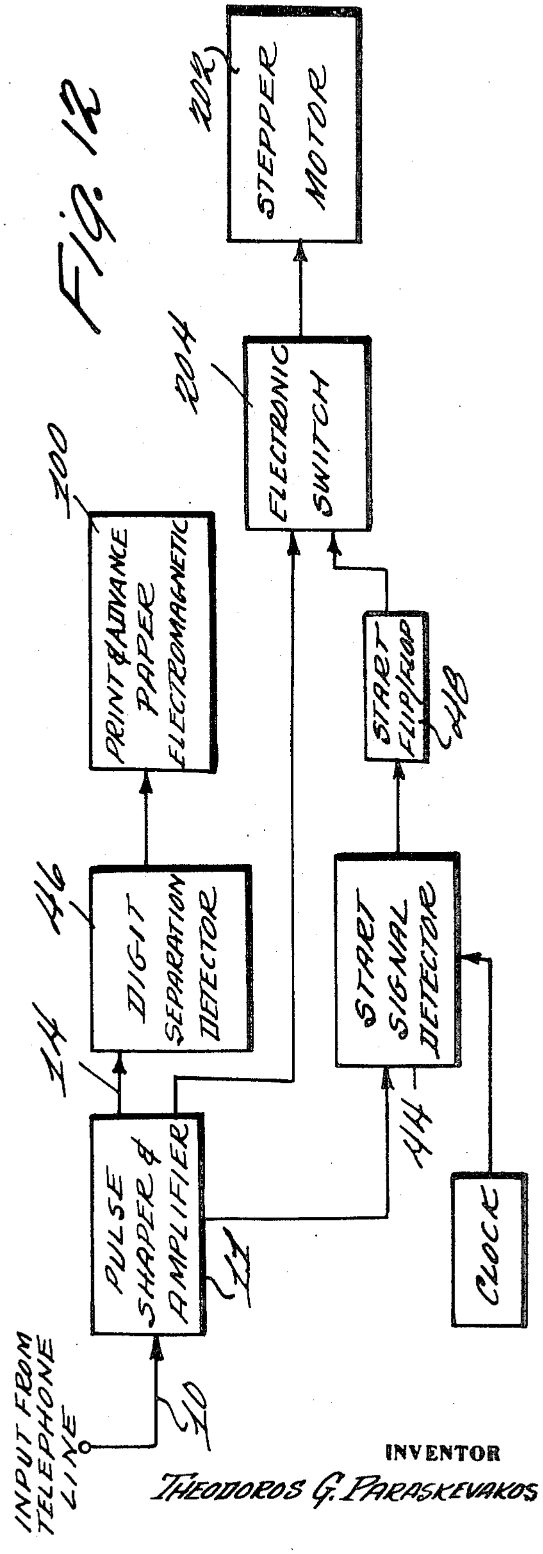
FIG. 12 is a block diagram of a further exemplary embodiment representing a modification of the FIG. 7 embodiment.

Another embodiment is shown in block form at FIG. 12. Actually this embodiment is just like that of FIG. 7 except that a digital stepper motor 202 is used to turn a print wheel instead of the prawl and ratchet means of FIG. 7. In this manner a higher frequency of received pulses may be accommodated. Since the conventional stepper motor used in the exemplary embodiment requires an associated electronic switch 204, this element is used instead of the simpler AND gate. Further, since the stepper has 24 steps per revolution, the print wheel preferably has 24 faces whereby one rotation of the print wheel in this embodiment is equivalent to two rotations in the embodiment of FIG. 7.

Figure 13:
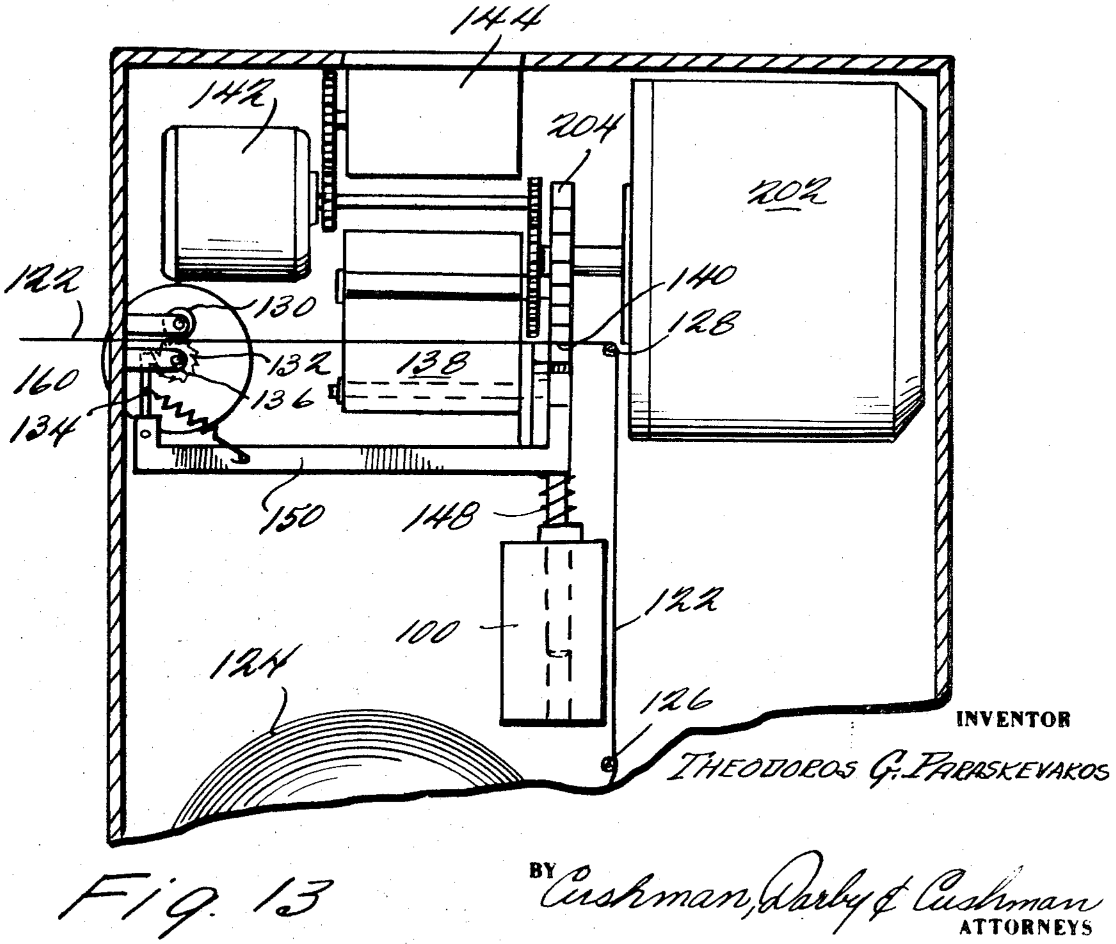
FIG. 13 is a more detailed cross-section view of the printing mechanism used in the FIG. 12 embodiment.

As shown in FIG. 13, most of the elements are analogous to those of FIG. 7 and are so labeled with reference numerals. Only the stepper motor 202 and 24 sided print wheel 204 are different in principle. Since stepper motors and their operation are already well known in the art, no detailed explanation of the operation of the FIG. 13 elements is believed necessary. It should be apparent from that already given for FIGS. 7–11.

Although not shown in the drawings, if a still higher receiving rate were desired, it could be accomplished by adapting another stepper motor to substitute for electromagnet 100. Of course, another electronic switch would have to be connected between the digit separation detector 46 and the new stepper motor as will be apparent to those in the art.

All of the above embodiments could be enhanced in some respects by adding memory units. For instance, if buffer memory units were used at the iput of the FIG. 7–13 embodiments to temporarily store the incoming data, the incoming information could be rapidly stored therein and later read out at a slower rate to permit printing at a later desired time. In this manner, the memory would act as an effective delay unit to accommodate the relatively slow speed mechanical or other printing elements. Of course, the memory could also function as a storage unit of any desired capacity to hold data therein for subsequent printing upon demand.

A memory unit could also be used with the electronic receiver of FIG. 1 as a method of increasing its capacity for holding and displaying data as should be apparent.

It should also be apparent that a plurality of storage units could be used in data checking operations to insure accurate received data before display. For instance, two identical sets of pulse trains could be transmitted at different times. If the decoded (or coded) received data is stored away for each set of pulse trains, it may be compared before a display or recording thereof is effected only if the two sets are equal as should be readily apparent to those in the art.

It should also be noted that the embodiment of FIG. 1 can easily be modified to decode the pulses transmitted as necessary in the embodiments of FIGS. 7–13. For instance, if all gates G1–G12 are initially opened for the first pulse train, then only gates G2–G12 are opened for the second pulse train, then only gates G3—G12 are opened for the third pulse train, etc. and if DCU No. 1–DCU No. 12 carried on the twelfth count rather than the tenth (i.e., no longer decimal counters), then it follows that the proper result would be displayed in the various channels as may be verified by a straight forward analysis. Further, this conversion would be very simple since, in addition to the already discussed modification of DCU No. 1–DCU No. 12, all that needs to be done is to move the connections from $\overline{Q}$ (to gates G1–G12) to Q on FF-1 to FF-12 and to eliminate the interstage reset feedback between the bistable stages FF-1 to FF-12. In this manner, the gates G1–G12 would be controlled as previously discussed and as should be apparent to those in the art.

Of course, the newer solid state printers, etc., may also be used in this invention as should be apparent to those in the art.

Further, an appropriate oscillator could be incorporated in the receiver of this invention for simulating a busy or ring back tone to the local exchange thus stimulating the local exchange transmitter to transmit the number just dialed right back to the calling telephone so that the caller can observe the correctness of the number just dialed if this feature is desired.

While only a few specific exemplary embodiments have been described in detail, those skilled in the art will readily realize that many modifications could be made in the exemplary embodiments without seriously altering the basic purpose or mode of operation of the devices. Accordingly, all such modifications are intneded to be included within the scope of this invention.

What is claimed is:

1. Receiving apparatus for decoding a group of signal pulse trains, each pluse train representing one digit or character of information data and for displaying said data, said apparatus comprising:

input means for accepting said signal pulse trains, digit separation detector means connected to said input means for discriminating between individual pulse trains and for generating a digit separation signal in response thereto, starting detector means connected to said input means for detecting a uniquely identifiable pulse train and for providing a start signal in response thereto, decoding and display means connected to said digit separation detector means and to said starting detector means for decoding and displaying each signal pulse train received only after said apparatus has been enabled by said start signal signifying that said uniquely identifiable pulse train has been detected.

2. Receiving apparatus as in claim 1 wherein said decoding and display means comprises:

a rotatable print wheel, incremental drive means connected to said print wheel, to said starting detector means and to said input means for incrementally rotating said print wheel in response to each pulse of incoming signal pulse trains occurring after detection of said uniquely identifiable pulse train, and means connected to said digit separation detector for recording characters on a recording medium from said print wheel in response to said digit separation signal.

3. Receiving apparatus as in claim 2 wherein said incremental drive means comprises an electromagnetically actuated prawl and ratchet assembly.

4. Receiving apparatus as in claim 2 wherein said incremental drive means comprises a digital stepper motor.

5. Receiving apparatus as in claim 2 further comprising recording medium advancement means for automatically advancing a recording medium in cooperation with said means for recording characters.

6. Receiving apparatus as in claim 1 further comprising recording means for automatically recording current time data together with said information data on a recording medium.

7. Receiving apparatus as in claim 1 wherein said display means includes recording means for effecting a potentially permanent display of said information data.

8. Receiving apparatus as in claim 1 wherein said decoding and display means comprises:

a plurality of separate channels for individually decoding and displaying each pulse train representing one character of said information data, and separation means for effectively separating and directing each successive pulse train to a particular corresponding channel for individual decoding and display.

9. A receiving apparatus for decoding a group of signal pulse trains, each pulse train representing one digit of a number and for displaying said number, said apparatus comprising:

digit detector means for discriminating between individual pulse trains and for generating a digit separation signal in response thereto, starting detector means for detecting a uniquely identifiable pulse train and for providing a start signal in response thereto, shift register means comprising a plurality of interconnected bistable stages, said shift register means being connected to said digit detector means and to said starting detector means to cause successive ones of said bistable stages to change state in response to successive digit separation signals occurring only after said apparatus has been enabled by said start signal signifying the detection of said uniquely identifiable pulse trains, a plurality of gate means each having one input connected to one of said bistable stabes and another input connected for receiving said signal pulse trains whereby any given gate means is enabled to pass the next occurring pulse train in response to its associated bistable stage changing state, and decoding and display means connected to each gate means for decoding and displaying the particular pulse train passed by its associated gate means whereby each successive digit of said number is successively decoded and displayed.

10. A receiving apparatus as in claim 9 wherein said digit detector means comprises a monostable multivibrator having a period at least equal to the time period between successive pulses of a single pulse train.

11. A receiving apparatus as in claim 9 wherein said starting detector means comprises:

clock means for generating clock pulses, first counter means, second counter means, gating means for simultaneously gating clock pulses to said first counter means and said signal pulses to said second counter means, first means connected to said first counter means for detecting a predetermined contents of said first counter means and for generating a first signal in response to such detection, second means connected to said second counter means for detecting a predetermined contents of said second counter means and for generating a second signal in response to such detection, and further means connected to said first and second means for generating said start signal in response to the simultaneous existence of said first and second signals whereby said start signal signifies receipt of a signal pulse train having a predetermined number of pulses.

12. A receiving apparatus as in claim 9 wherein said shift register means comprises a plurality of cascaded bistable flip-flop stages with a first stage connected to said starting detector means and with all other stages connected to said digit detector means.

13. A receiving apparatus as in claim 9 wherein each of said gate means comprises a logical NOR gate.

14. A receiving apparatus as in claim 9 wherein each of said counting and display means comprises:

digital decimal counting means for counting the number of pulses in a given pulse train and for providing electrical outputs representing the number of counted pulses, and visible display means for recording said electrical outputs as a decimal representation thereof whereby each digit of said number is recorded in a decimal notation.

15. A receiving apparatus as in claim 9 further comprising:

delay means connected to the last one of said bistable stages for detecting the last of the series of pulse trains representing said number and for automatically disabling said shift register means from beginning another cycle of operation for a predetermined time period whereby continuous display of the entire number is insured for at least said predetermined time period.

16. A receiving apparatus as in claim 9 further comprising:

input means connected for receiving said signal pulse train and for amplifying and shaping the individual pulses thereof before subsequent use in said apparatus.

17. A receiving apparatus as in claim 16 wherein said input means comprises:

solid state amplifier means for amplifying said pulses, and trigger means connected to said amplifying means for making the pulses of more uniform dimensions.

18. A receiving apparatus as in claim 17 wherein said trigger means comprises a Schmitt trigger.

* * * * *